UNITED STATES PATENT OFFICE 2,024,123

COATING COMPOSITION AND METHOD OF PREPARING SAME

Webster E. Byron Baker, Lock Haven, Pa., assignor to Stein, Hall & Company, Inc., New York, N. Y., a corporation of New York No Drawing. Continuation of application Serial No. 367,627, May 31, 1929. This application July 2, 1932, Serial No. 620,730

16 Claims. (Cl. 91—70)

This invention relates to an improved coating composition for paper, and to a process for making same and is a continuing application of my earlier application Serial No. 367,627, filed May 31, 1929.

It is an object of my invention to provide a coating composition which when dissolved in water, combines a high degree of fluidity with a large content of a mineral ingredient, such as china clay.

Another object is to provide a coating composition which, on drying, will liberate an acid capable of acting upon certain of the constituents of the coating mixture, to reduce the hydration capacity thereof and to convert part of the bonding material into insoluble form, and to improve the surface of the finished paper.

A further object is to provide a process for the production of such a composition.

Other objects of my invention will appear as the description proceeds.

By way of introduction and explanation, coated papers of such types and classes as books and printing papers, lithographic papers, wall papers, box papers, cover papers, etc., are made by the application of finely divided mineral matter, such as china clay, blanc fixe, satin white or barytes, in homogeneous suspension in a freely flowing fluid mixture, to the surface of a suitable base paper by means of a coating machine consisting of an appropriate arrangement of rolls and brushes, adapted to transfer the liquid mixture from a vat or trough in the form of a film onto the surface of the base sheet, brush the film out even, and cause it to penetrate the surface to the required degree, and subsequently drying the film on the base paper by causing the coated sheet to travel through a festoon type dryer or its equivalent.

At least two properties must be possessed by the coating liquid composition in the vat or trough supplying the coating rolls and brushes, viz., (1) It must flow freely, even when carrying in suspension large proportions of solid suspended mineral matter of the kinds above mentioned, e. g. 35–45% finely divided china clay; percentages being calculated on the basis of the weight of the entire mixture including water. (2) There must be present in the coating mixture a substance capable of bonding the clay or mineral particles firmly together and to the sheet upon drying, so that the sheet may be subsequently calendered or given a smooth, continuous glossy surface by analogous known means.

In addition to the above, the finished coated and calendered sheet must possess the correct degree of absorption for inks and the coating must be resistant to disintegration by water to the required degree.

In the early state of the art of manufacture of coated paper, glue and gelatine were used in solution in connection with clay or other mineral matter of the kinds above mentioned. Alum was also in some cases added, and likewise in some cases some formaldehyde to assist in hardening, preserving, and rendering the resulting coating more insoluble.

Later on in the development of the art casein was introduced. It possesses some advantages over glue, and gelatine, viz., (1) it gives a finished coated sheet on which the coating film is more insoluble, and hence more resistant to water; (2) it is cheaper than glue and gelatine of the grades usable; (3) it is generally more uniformly obtainable. On the other hand, it possesses some disadvantages over glue, and gelatine, viz., (1) the coating does not possess as good absorptive properties for inks as do glue and gelatine, hence half tone prints are comparatively lacking in brilliance and graduation of tones; (2) the handling is more complicated in respect to complexity of mixtures, as casein requires the use of alkalies, usually including some ammonia, to make it soluble.

In contrast to the above, my new product consists of a composition of matter containing a slightly dextrinized, chemically processed starch in conjunction with a soluble silicate so blended that definite chemical reactions take place in the clay or other mineral matter suspension both before and after application to the sheet of base paper.

While I am cognizant of the fact that some types of oxidized starches and so called thin boiling starches have been used to a limited extent in coating paper with clays, etc., none of the starches so used, with which I am familiar, possesses the distinctive properties and attendant advantages my product possesses. These distinctive properties and attendant advantages I attribute to the fact that my product is so constituted that the starch component thereof breaks down in solution upon drying, with liberation of weak acid adapted to produce a gradual decomposition of soluble silicates in the presence of the first decomposition products of the chemically treated starch-containing component of my composition, generating gelatinous silicic acid and simultaneously causing the solution and the finally dried coating to become more acid, which is accompanied by decreased molecular hydration capacity of the starch derivative component, and decreased fluidity of the system starch-silicic acid—clay—water. The ultimate result of these reactions in the finished coated paper is a coating bonded partly by starch in a state of relatively low molecular hydration capacity and partly by gelatinous silicic acid, which coating, upon thorough drying becomes relatively insoluble in water and not so readily disintegrable as when other types of starches are used.

The technical advantages of my coating composition may be pointed out as follows:

(1) On the coated paper prepared with it, brilliant half tones are obtainable by usual printing processes, comparable with those obtainable when glue is used.

(2) My coating composition is more economical to use than glue or casein.

(3) It is applied to the paper and prepared for its application in a simpler, easier manner.

(4) It is not subject to putrefaction as are casein and glue, with attendant objectionable odors.

My product may be made as follows: Starch, or a material of a relatively high starch content of any botanic origin, is mixed thoroughly in the normally air dry state (moisture content approximately 10–13%) with a volatile weak organic acid throughout which is diffused a small quantity of volatile strong mineral acid, by spraying this mixture into the mixing chamber during stirring. A relatively concentrated solution is used in each case. This mixing procedure is conducted at a temperature of approximately 30° C. Subsequent to this the mixture is stored at 30° C. for approximately 36 hours, after which period the chemical reaction upon the starch has proceeded to the desired extent. Further action is then arrested by stirring in the mixer and at the same time adding in spray or atomized form an amount of strong ammonia water sufficient to neutralize residual acidity as well as that loosely combined with the starch. An optional method of neutralization consists of the use of ammonia gas. The neutrality is tested by stirring up a sample of the product with water and testing with litmus paper or equivalent indicator. After neutralization, dry, soluble sodium silicate (preferably the meta-disilicate, Na2Si2O5, or its equivalent) is admixed with further stirring in such quantity that the sodium contained is chemically equivalent to the total acid used in the first step of the process of manufacture, and in addition to this a slight excess is added; this excess providing for the neutralization of any acids present in the clay and other materials entering into the coating liquid.

The above describes the preparation of my starch-silicate composition. If the neutralized product, before addition of sodium silicate, is brought to a low boil in 4 to 5 parts of water, I obtain a solution resembling in physical characteristics a natural gum. It has a relatively thin body and does not gelatinize upon standing or cooling. It is translucent, and possesses few of the heavy bodied characteristics of the original starch. It might be considered a mildly dextrinized, soluble starch, weakly esterified with a weak organic acid.

While I do not limit my proportions strictly and also retain full latitude of equivalents, I state for example the following formula giving parts by weight:

| | |
|---|---|
| Starch or a starch-containing material, e. g. corn starch, potato starch, tapioca flour, etc. | 100 |
| Volatile organic acid (acetic or equivalent) | 4 |
| Volatile mineral acid (hydrochloric or equivalent) | 0.4 |

After the reaction is completed, add sufficient ammonia to neutralize, and then

| | |
|---|---|
| Soluble silicate (sodium silicate,-meta-disilicate Na2Si2O5,—or its equivalent) | 10 |

The above chemicals are given on a 100 per cent concentration basis. The acetic acid can be used in concentration 80–85%, but preferably not lower. The hydrochloric acid should be used in the most concentrated form available. The dry silicate used may contain about 15–18% crystal water and moisture. The starch should preferably be of 10% or less moisture content.

In making a clay coating composition with the use of the starch-silicate composition above described, I proceed as the following formula indicates, parts being by weight

| | |
|---|---|
| Starch-silicate composition | 24 |
| Water | 75 |

Mix, and heat to boiling. The product thus formed, either directly or after cooling, is mixed with

| | |
|---|---|
| China clay | 100 |
| Water | 60 |

Any desired dye or color, to produce any shade may be added, for example, in 4% solution. The china clay may be mixed separately in the 60 parts of water, or the last named ingredients may be added successively to the boiled starch-silicate size and water. Additional water can then be added to adjust the content of total solids to any desired figure, for example 35% in straight clay coatings.

As another typical formula for a clay coating, I may take:

| | |
|---|---|
| Starch-silicate composition | 18 |
| Water | 60 |
| China clay | 100 |
| Water | 60 |
| Dye or color | As desired |

The ingredients are mixed as before described, and additional water is added to adjust the final content of total solids as desired.

Analogous procedures apply where blanc fixe, barytes, satin white, talc, etc. are used alone or in conjunction with clay, but with the usual adjustments of total solids.

The above procedures give free flowing suspensions even with mineral matter proportions considerably in excess of 35%. This fact makes the above coating size useful for grounding and printing box cover and wall papers, etc. where higher proportions are often employed. This is true even when considerably less of the bonding or mineral matter carrying starch-silicate composition is used, where bonding strength is not so important.

While I do not intend that the invention shall be limited by any theories herein expressed as to the chemical or physical changes that take place, it is believed that the reasons for the above are to be found in the phenomenon of hydration. Substances which have the property of taking up water by hydration, when placed in water yield solutions or systems varying greatly as to viscosity and fluidity, even though possessing the same degree of molecular hydration capacity, depending upon the relative amount of free water remaining and the mobility of the hydrated molecules. So, therefore, if to a highly viscous solution or suspension containing highly hydrated molecules or where the solid particles in suspension have united with all the water, leaving no free water, there is added a second substance of similar or greater hydration capacity, or water attracting power, and greater mobility, this second substance will rob the first of at least a part of its water of hydration, with the net result that a solution or suspension of greater fluidity than if the second substance were absent, is produced, although the total percentage of water present is unchanged. If now, it is possible to decrease the hydration capacity of the substance which is relied upon to increase the fluidity, the water will return to the less fluid substance as water of hydration and the mass will again become less fluid.

For example, if a clay—water system contains a certain amount of water (chiefly as water of hydration) the clay will be extremely viscous.

If now, there is added even a relatively small quantity of a material which has a relatively high water attracting power and greater mobility, this material will rob the clay of at least part of its water of hydration and produce as a net result a suspension of much greater fluidity than if the last mentioned material were not present, although the total percentage of water is unchanged.

If clay and water are mixed in concentrations such as 35% or more, the mixtures will have very little fluidity, particularly at the higher percentages where the viscosity becomes greater and greater very rapidly. The reason is that there is not enough water present to satisfy the hydration capacity of the solid insoluble clay particles, hence no water remains for the clay particles to move thru. Upon adding my starch-silicate composition, the molecules in solution in the alkaline state, say pH-9 or slightly greater, have a large water attracting power, greatly exceeding that of the clay under these conditions, and therefore take the hydration water away from the clay, permitting the whole mass to become more fluid and the clay to flow. In the case of my composition, a lowering of the hydrogen ion concentration number of the mass will reduce the molecular hydration capacity of the starch molecules and the viscosity of the coating will increase enormously.

The expression "lowering the hydrogen ion concentration number" refers to a lowering of the negative exponent equivalent to the normality concentration of hydrogen ions. This negative exponent is always written positively and spoken of as the pH number. Thus a change of pH-9 to pH-5 is spoken of as a lowering of the pH number, or a "lowering of the hydrogen ion concentration number," although in reality this represents an increase in the hydrogen ion concentration or acidity.

Now my coating size, both by reason of its breaking down by acidic hydrolysis in solution upon drying and by reason of circumstances surrounding the application of the coating to the paper, is peculiarly well adapted to the realization of the above aims, i. e. the desired indicated change in hydrogen ion concentration, in the direction of an increase in acidity present, with the attendant decrease in hydration of the starch derivative and decrease in fluidity of the system, as well as the generation of gelatinous silicic acid.

When the coating or size in liquid form is applied to the sheet of paper and dried in the usual manner, ideal conditions exist for the attainment of my object, viz:

(1) The alkaline condition of the liquid expedites the rapid penetration into the sheet to the required degree for a good bond with the surface of the sheet.

(2) The acidity in the sheet of base paper reacts with and starts to lower the alkalinity of the coating by reaction with excess silicate of soda and simultaneously starts liberating colloidal hydrated silicic acid, thus starting the process of gelation.

(3) When heated in the course of drying the paper, the sodium in the silicate of soda replaces the ammonia used in neutralizing during the manufacture of the coating size and volatilizes the ammonia into the air, making the system more acid, lowering the hydrogen ion concentration number to the neighborhood of pH-7.

(4) The slightly esterified starch, on being heated, will decompose with the liberation of free acetic acid. This aids in lowering the pH of the surface coating, the acid aiding further as pointed out in the next section.

(5) When the above reactions are taking place the hydrated silicic acid gel is being formed as a result of the action of the free acetic acid on the silicate, and dried into the insoluble state, and the coating is becoming more acid and may become as acid as pH-5, or until it is in balance with the acidity at the surface of the base sheet.

Completion of drying and calendering yields a coating in which the starch component has a relatively low hydration capacity, hence the coating does not readily disintegrate due to tendency to become fluid in the presence of water. The coating is also resistant to "picking", when printed with viscous, tacky inks.

While I have described my invention in terms of specific examples, it is to be understood that these are for purposes of illustration only, and are not intended as limitations. My invention comprises equivalent steps and constituents, and is to be construed only in the light of the prior art and the scope of the appended claims.

I claim:

1. A process for making a coating composition adapted to react when applied to the surface to be coated to form a substantially insoluble surfacing material comprising treating starch with a concentrated weak fatty monobasic liquid organic acid, in the presence of a small amount of a strong acid whereby a mildly dextrinized and esterified soluble starch is formed, neutralizing the uncombined acid, and adding a soluble substance adapted to liberate silicic acid under acid conditions.

2. A process for making a coating composition adapted to react when applied to the surface to be coated to form a substantially insoluble surfacing material comprising treating starch with substantially 4% of its weight of a concentrated weak fatty monobasic liquid organic acid and in the presence of a small amount of strong inorganic acid, adding sufficient ammonia to give the product a reaction of substantially pH 9 and adding dry soluble sodium silicate in amount equal to substantially 10% of the weight of the starch.

3. A process for making a paper coating adapted to react when applied to the surface to be coated to form a substantially insoluble surfacing material comprising treating a starch-containing material with a fatty monobasic organic acid and in the presence of a small amount of strong inorganic acid, neutralizing the excess acid with ammonia, adding dry soluble sodium silicate, dissolving said mixture in boiling water, and combining said solution with a wet china clay.

4. A coating composition comprising starch mildly esterified and dextrinized with a fatty monobasic liquid organic acid, a base in quantity sufficient to make the product basic in reaction, and dry soluble sodium silicate.

5. A coating composition comprising starch mildly esterified and dextrinized with a weak monobasic organic acid, ammonia sufficient to make the product basic in reaction, and dry soluble sodium silicate.

6. A coating composition comprising starch mildly esterified and dextrinized with a weak fatty organic acid, ammonia sufficient to give the product a reaction of substantially pH 9, and dry soluble sodium silicate.

7. A coating composition comprising starch mildly esterified and dextrinized with acetic acid, ammonia sufficient to make the product basic in reaction, and dry soluble sodium silicate.

8. A coating composition comprising starch mildly esterified and dextrinized with a weak fatty organic acid, a weak base in quantity sufficient to make the product basic in reaction but making the reaction product subject to acidic hydrolysis upon concentration of its solution, and dry sodium silicate.

9. A coating composition comprising starch mildly esterified and dextrinized with a weak monobasic liquid acid, a weak base, and dry sodium silicate, all in proportions such that hydrated silicic acid will be generated through acid hydrolysis of the starch-containing component upon concentration of the solution.

10. A process for making a paper coating adapted to react when applied to the surface to be coated to form a substantially insoluble surfacing material comprising dissolving a composition according to claim 8, in substantially three times its weight of water, moistening china clay with substantially five-thirds of its weight of water, and adding to the moistened china clay approximately its dry weight of the solution.

11. A process for making a paper coating of substantially insoluble surfacing material comprising treating a starch-containing material to produce weak esterification and dextrinization of the starch constituent thereof, adding a volatile alkaline substance then admixing therewith a dry soluble sodium silicate, dissolving the mixture in water, combining the solution with china clay, applying the coating to the paper to be coated, and heating to volatilize said alkaline substance and to cause generation of hydrated silicic acid through acid hydrolysis of the starch-containing component upon concentration of the solution.

12. A process for making a coating composition adapted to react when applied to the surface to be coated to form a substantially insoluble surfacing material, comprising treating starch with a fatty monobasic liquid organic acid to esterify the same while substantially avoiding the dextrinization of said starch, adding a sufficient quantity of a base to completely neutralize all of the said free organic acid, and adding a soluble silicate adapted to liberate an insoluble silicic acid gel, the proportions of said starchy material to said soluble silicate being approximately 10 to 1.

13. A coating composition adapted to react when applied to the surface to be coated to form a substantially insoluble surfacing material, comprising starch esterified with a fatty monobasic liquid organic acid, said starch material being substantially free from dextrinized components, a base in quantities sufficient to make the product basic in reaction, and dry soluble sodium silicate, the proportions of said esterified starch material to said sodium silicate being approximately 10 to 1.

14. A coating composition adapted to react when applied to the surface to be coated to form a substantially insoluble surfacing material, comprising a starch containing material in combination with a weak fatty liquid organic acid and a weak base in sufficient quantity to make the product basic in reaction but making the reaction products subject to acidic hydrolysis upon concentration of its solution, said starchy material consisting substantially of esterified starch, and dry sodium silicate, the proportions of said starchy material to said sodium silicate being approximately 10 to 1.

15. A process for making a paper coating of substantially insoluble surfacing material, comprising treating a starch containing material to produce weak esterification of the starch constituents thereof while substantially avoiding the formation of dextrine, adding a volatile alkaline substance then admixing therewith a dry soluble sodium silicate in proportions with said starchy material of approximately 1 to 10, dissolving the mixture in water, combining the solution with china clay, applying the coating to the paper to be coated, and heating to volatilize said alkaline substance and to cause generation of hydroxyl silicic acid through acid hydrolysis of the starch containing component upon concentration of the solution.

16. A process for making a paper coating adapted to react when applied to the surface to be coated to form a substantially insoluble surfacing material, comprising treating a starch containing material with a fatty liquid monobasic organic acid whereby the starch is esterified while substantially avoiding the formation of dextrine components, neutralizing the excess acid with a volatile alkaline substance, adding dry soluble sodium silicate in proportions of approximately 1 to 10 with the starch components, dissolving the mixture in boiling water and combining said solution with china clay.

WEBSTER E. BYRON BAKER.